BATE & CAULKINS.
Coffee Roaster.
No. 25,941.             Patented Nov. 1, 1859.
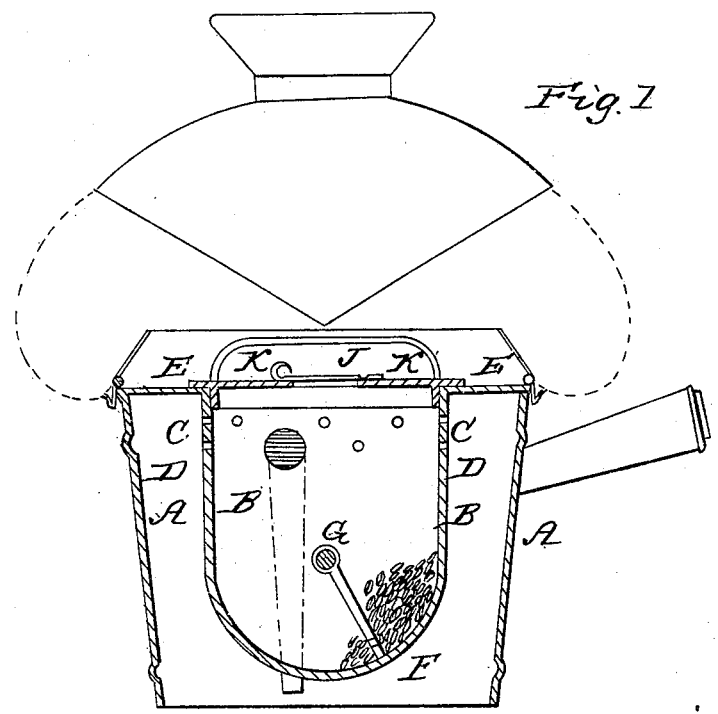
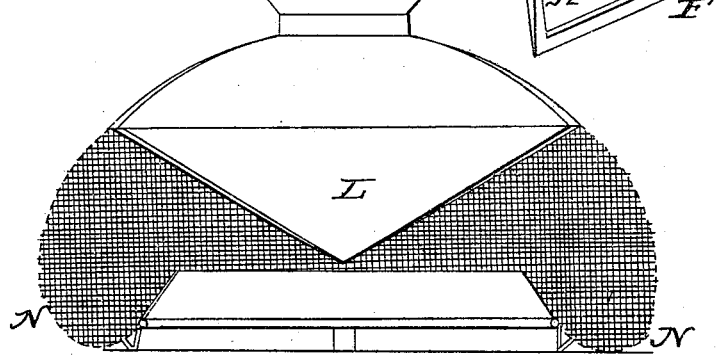

UNITED STATES PATENT OFFICE.

R. L. BATE AND J. CAULKINS, OF ADRIAN, MICHIGAN.

COFFEE-ROASTER.

Specification of Letters Patent No. 25,941, dated November 1, 1859.

*To all whom it may concern:*

Be it known that we, RICHARD L. BATE and JARVIS CAULKINS, both of Adrian, in the county of Lenawee and State of Michigan, have invented a new and Improved Coffee-Roaster; and we do hereby declare that the following is a full, clear, and exact description thereof, reference being had to the accompanying drawings and to the letters of reference marked thereon, of which—

Figure 1 represents a vertical middle section through the roaster showing the operation of stirring the coffee. Fig. 2 shows a section of a hood which is placed over the roaster when it is used for toasting corn. Fig. 3 is a view of the stirrer.

The nature of our invention consists, first, in a vertical stationary inner cylindrical chamber having escape passages at its sides and a removable top, in combination with a revolving skeleton or open stirrer, and a vertical cylindrical outer casing which is open at its bottom and arranged round the inner chamber so as to form a circulating passage for the heated current and for the gases escaping from the coffee being roasted; the whole being constructed, arranged and operating in the manner hereinafter described.

By our invention a coffee roaster combining all the good qualities of several previously patented roasters is produced and which by simply removing its top and substituting a deflecting and receiving hood answer admirably for popping corn.

A represents a cylindrical jacket, or casing, which surrounds a chamber B, the sides C of which are vertical, while the bottom, which extends nearly down to the bottom of the casing, is semi-cylindrical. These form a space D closed at the top by E, in which the fire has free access to the entire exterior surface of the chamber B. Near the top of this chamber, and opening into the space D are perforations through which the smoke from the coffee escapes during the operation of toasting, and is consumed; thus the disagreeable odor is prevented from escaping into the room. The coffee is kept stirred while it is being roasted by a horizontal strip F, which is rotated by a shaft G, being connected to the shaft by two arms H, H, as shown by Fig. 3. The strip as it is rotated keeps the coffee in constant agitation, and roasts it evenly and with great facility without a liability of burning. A sliding cover J is fixed to the cover K, which can be opened in order to ascertain when the coffee is sufficiently roasted.

This coffee roaster is very useful for toasting or parching corn, and for this purpose a wire screen, constructed and arranged as shown by Fig. 3, is placed on top of the roaster, the corn having been previously placed in the roasting chamber. When the popping of the corn commences it flies out of the chamber and strikes the surface of an inverted cone L, and is thrown over into the concave portion N of the screen, and thus prevented from falling on the floor, or stove, or returning into the roasting chamber again.

What we claim as our invention and desire to secure by Letters Patent, is—

The combination of the stationary cylindrical chamber, revolving skeleton stirrer and outer vertical cylindrical casing, all constructed in the manner and for the purposes set forth.

RICHARD L. BATE.
JARVIS CAULKINS.

Witnesses:
J. K. JOHNSON,
NORMAN GEDDES.